United States Patent

[11] 3,600,896

[72] Inventors Tamotu Tateisi;
Akihisa Mori; Takeo Takagi; Masanori Ogino; Keinosuke Hara, all of Yokohama, Japan
[21] Appl. No. 869,514
[22] Filed Oct. 27, 1969
[45] Patented Aug. 24, 1971
[73] Assignee Bridgestone Tire Company Limited
Tokyo, Japan
[32] Priority Oct. 29, 1968
[33] Japan
[31] 43/78323

[54] MARINE FENDER ASSEMBLY
9 Claims, 7 Drawing Figs.

[52] U.S. Cl. .................................................. 61/48,
114/219, 267/140
[51] Int. Cl. .................................................. E02b 3/22
[50] Field of Search .................................... 61/48, 46;
114/219; 267/139–141, 182

[56] References Cited
UNITED STATES PATENTS
3,339,907  9/1967  Parker ......................... 114/219 X
3,507,123  4/1970  Miura ......................... 61/48

Primary Examiner—J. Karl Bell
Attorney—Stevens, Davis, Miller & Mosher

ABSTRACT: A marine fender assembly for protecting a wall from impact, including a frontal plate spaced from the wall and one or more fender bodies disposed between the frontal plate and the wall. The fender body is made of elastomer and comprises a hollow cylindrical portion and a pair of flanges which are integrally formed with the cylindrical portion at opposite ends thereof. One of the flanges of the fender body is secured to the wall in such manner that the axis of the fender body extends at right angles to the wall. The frontal plate is secured to the other one of the flanges of the fender body

MARINE FENDER ASSEMBLY

This invention relates to a marine fender assembly, and more particularly to a marine fender assembly which is to be mounted on quay walls, or on the sideboard of a vessel, for absorbing shock energy and preventing the occurrence of hazardous friction between the sideboard of the vessel and the quay wall during berthing and mooring of the vessel, which friction causes scratches on the vessel's sideboard. The fender assembly of the invention is also effective in absorbing shock energy and preventing friction of the aforesaid type, which are caused by a vessel moored at the quay.

The present invention relates to improvement of marine fender assembly including fender bodies, each consisting of a hollow cylindrical resilient member made of natural or synthetic rubber, which fender bodies are mounted on walls to be protected, e.g., quay walls or sideboards of vessels, with the axes of the fender bodies being disposed at right angles to the wall, whereby shock energy can be absorbed by the fender during berthing and mooring of a vessel.

A principal object of the present invention is to provide a marine fender assembly for absorbing berthing shock or impact, so as to protect both quays and vessels from heavy impact applied thereto during berthing. The fender assembly also absorbs impacts and large stresses caused by a vessel which is moored.

Another object of the present invention is to provide a marine fender assembly comprising fender bodies made of resilient material and frontal plates, which bodies and plates can be so combined and disposed that the marine fender assembly can fulfill a wide range of performance requirement and can protect complicatedly shaped walls.

Generally speaking, marine fenders are used to absorb the berthing impact of a vessel when the vessel is berthed to a quay, a dolphin, and the like, so as to protect both the vessel and the installation to which the vessel is berthed. Such marine fenders are required to produce as small a reactive force as possible for mechanical shock of given magnitude, and to have as large an energy absorbing power as possible.

Fender bodies made of elastomer, such as natural and synthetic rubber, in various forms have been used for years. The load deflection characteristics of fenders heavily depend on their configuration.

The inventors have made a series of studies on the shape of resilient fender body and the performance of various combinations of such fender body with those of other solid shock-receiving members. As a result, the inventors have succeeded in finding a special combination of resilient fender bodies of specific configuration and solid shock-receiving members, i.e., frontal plates.

For a better understanding of the invention, reference is made to the accompanying drawings, in which.

Like parts are designated by like numerals and symbols throughout the drawings.

Figure 1A:
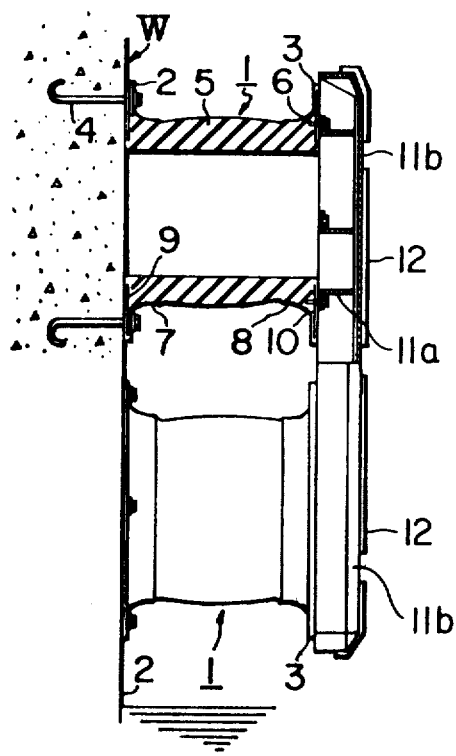
FIGS. 1a and 1b are, respectively, a side elevation with a part in section and plan view with a part cutaway, of a marine fender assembly, according to the present invention.

In berthing, a vessel (not shown) seldom approaches the quay at right angles, but usually in an oblique direction, to produce lateral loads to fenders mounted on the quay wall. In order to absorb such oblique load, a plurality of fender bodies are sometimes disposed in different directions The vessel, however, makes contact with only a few of such fender bodies, so that considerably large oblique load is applied to the few fender bodies. Accordingly, large oblique load tends to damage the fender bodies under extremely heavy loading conditions.

If hard spots of fender bodies stick out of the quay wall, such sticking hard spots might scratch the painted surface of a vessel or even make dents on the sideboard of the vessel, due to concentrated strain at those spots. Accordingly, it is necessary to disperse the impact stress at such spots to a wider area for instance by disposing a solid shock-receiving member with a wide surface in front of the fender bodies. Thereby, berthing impact, or impact caused by vessels moored, can be dispersed so as to substantially eliminate the aforesaid paint scratch and dents.

As a result of years of studies, the inventors have found that if a fender body consisting of hollow cylindrical elastomer, e.g., natural synthetic rubber, is mounted on the quay wall, with its axis being disposed at right angles to the wall, the desirable load deflection characteristics of the aforesaid elongated trapezoidal fender member can be achieved, while eliminating the adverse directional differences of the rigidity U.S. Pat. No 3,339,907, which was granted to W S Parker on Sept. 5, 1967, discloses a marine fender unit of prior art construction having defects of the type overcome by the present invention. Parker teaches the conditions of $d=\frac{1}{2}D$ and $H=1.5D$, for the optimal performance characteristics of his fender unit U S. Pat. No. 3,172,268, which was granted to J R Gensheimer on Mar. 9, 1965, refers to a similar fender body and teaches the condition of $\frac{1}{2}(D\ d) \leq H$ for the optimal performance characteristics of the fender body The Parker fender unit has drawback in that it has small rigidity to shearing load caused by the rolling, yawing, and pitching of the vessel during the berthing and the mooring As a result of it, the Parker fender unit is deformed greatly upon application of such shearing load. The small shearing rigidity is due to the fact that only the mounting flange is secured to the quay wall while connecting the other flange to the mounting flange only through the chain. When the Parker fender unit is deformed, the chain is subjected to a very large tension for holding the shock-receiving flange. Furthermore, after the fender body is laterally deformed to a certain degree, its rigidity rapidly increases, so that the chain may be broken by further increase of the shearing load from the vessel If the chain is broken, the buffering function of the Parker fender unit is substantially lost.

The axial compression to the Parker fender unit from a vessel also causes the chain to sag, so that the thus sagged portion of the chain interferes with the deflection of the cylindrical elastomer portion thereof. The shearing load also produces heavy stress to binder filled between the other flange and the cylindrical fender body made of elastomer, and sometimes the other flange is dismounted from the cylindrical elastomer body by such heavy shearing load. It is difficult to obviate the aforesaid difficulties of Parker's fender unit by modifying the design of the hollow cylindrical body or the chain connecting the other flange to the fender body.

In addition, the specified conditions of $D=2d$ and $H=1.5D$ tend to make it difficult to provide high rigidity to shearing load. The chain is used as a tension member in the Parker fender unit. The initial tension of the chain, however, tends to decrease as time elapses due to the aging of the elastomer constituting the fender body. As a result of it, the bondage between the flanges and the cylindrical fender body slackens Thus, the Parker fender unit requires rather frequent checking and maintenance work to keep it under operative conditions.

The Parker chain has further shortcoming in that its structure is complicated, that it produces noise, and that it is prone to stains.

In short, conventional fender assemblies use separate hollow cylindrical bodies and flanges, and such combination of separate bodies and flanges results in a low shearing rigidity. The specified dimensions of the hollow cylindrical fender body are not necessarily sufficient for supporting the solid shock-receiving members, and auxiliary facilities (not shown) are used, which make the structure complicated.

Therefore, an object of the present invention is to provide an improved marine fender assembly, which obviates the aforesaid difficulties of conventional fenders.

A marine fender assembly according to the present invention includes one or more hollow cylindrical fender bodies made of elastomer, such as natural or synthetic rubber, and a pair of flanges integrally molded with the fender body, whereby one of the flanges is used for securing the assembly to a wall to be protected while the other flange is used for mounting a frontal plate on the fender bodies.

In the following description, the marine fender assembly of the invention will be illustrated by referring to an example, which is mounted on the quay wall, but it is, of course, possible to mount the fender assembly on the sideboard of a vessel or any other walls to be protected.

Figure 1B:
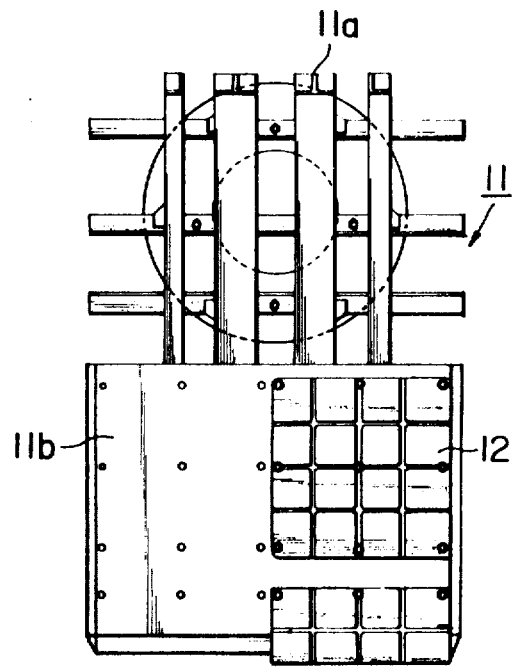

Referring to FIGS 1a, 1b, a plurality of anchor bolts 4 are embedded in the wall W of a quay, and two hollow cylindrical bodies 1 made of elastomer, such as natural and synthetic rubber, are mounted on the quay wall W by securing mounting flanges 2 of the fender bodies to the anchor bolts 4. A separate frontal plate 11 is mounted on the other end flanges 3 of the fender bodies 1.

In this embodiment of the invention, as shown in FIG. 1a and 1b, the frontal plate 11 consists of a framework 11a fabricated by assembling shaped steel and a plate member 11b bonded to the framework 11a by suitable means, e.g., by gluing or screwing. The framework 11a is bolted to the flanges 3 of the two fender bodies 1. A plurality of pads 12 are secured to the outer surface of the frontal plate 11, for instance, by screwing.

Figure 2:
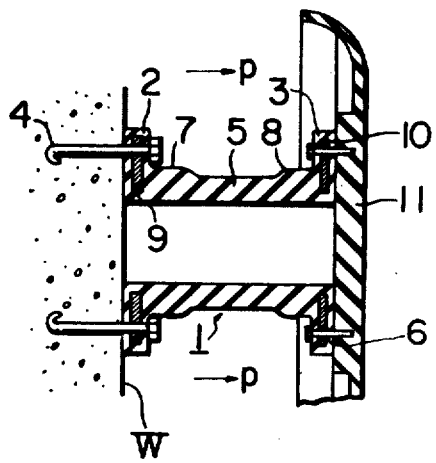
FIG. 2 is an enlarged longitudinal sectional view of a fender body usable in the marine fender assembly of the invention.

FIG. 2 illustrates the detailed construction of each fender body 1. The flanges 2 and 3 are integrally formed with the hollow cylindrical drum portion 5 at the opposing ends thereof, by molding, and enlarged portions 7 and 8 are formed at the boundaries between the drum portion 5 and the flanges 2 and 3, respectively. It is preferable to provide core rings 9 and 10 in the flanges 2 and 3, respectively. A plurality of mounting holes 6 are bored through the flanges 2 and 3 in parallel with the axis of the drum portion, so as to facilitate the mounting of the fender body 1 to the wall W to be protected and securing the frontal plate 11 to the fender body 1.

In the illustrated embodiment, two hollow cylindrical fender bodies 1 are used, but the number of the fender bodies 1 in a fender assembly according to the present invention is not restricted to two. In fact, any number of the fender bodies 1, i.e., one or more than one of fender bodies, can be used together with one or more frontal plates 11.

Figure 3:
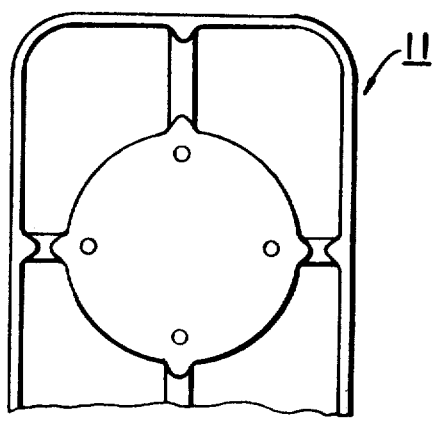
FIG. 3 is a bottom view of a frontal plate, as seen from the direction P—P of FIG. 11.

The frontal plate 11 can be secured to the two fender bodies in common, or separate such members 11 can be individually mounted on each of the fender bodies 1. Contact pads 12, which may be in the form of rubber plates, can be mounted on the outer surface of the frontal plate 11. If the frontal plate 11 is made of elastic and abrasion-resisting material, such as synthetic resin, the contact pads 12 can be dispensed with, as shown in FIG. 2. FIG. 3 shows a frontal plate 11 made of elastomer, as seen from the direction of arrows P—P of FIG. 2.

The dimensions and the shape of the contact pads 12 should match with those of the flanges 3. It is preferable to provide suitable bolt holes in the contact pads 12 to facilitate their mounting to frontal plates 11 in such manner that the contact pads 12 should not cause friction or scratches to the sideboard of the vessel being berthed or moored. To this end, the bolt heads can be sunk within the contact pads 12, so as to prevent the bolt heads from extending out of the pad surface. Alternately, the contact pads 12 can be securely bonded to the frontal plates 11 by suitable adhesive.

If the aforesaid structure is made in the following dimensions, the marine fender assembly of the present invention provides stable operation not only for axial compressive impact but also for oblique or eccentric load during berthing and mooring of a vessel. The compressive impact is distributed throughout the fender bodies 1 by the shock receiving member 11, and high rigidity to shearing load is ensured. The enlarged portions 7 and 8 between the drum portion 5 and the flanges 2 and 3 stabilize the buckling of the fender body 1 and also increase the rigidity to shearing load.

Figure 6:
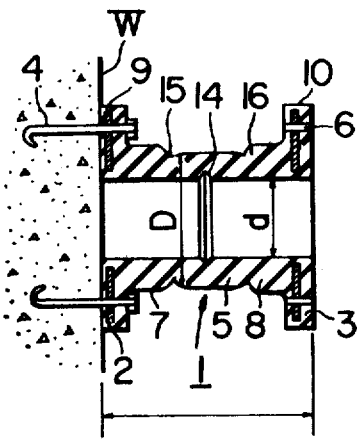
FIG. 6 is a schematic sectional view of a resilient fender body with annular grooves, according to the present invention.

According to the present invention, it is also possible to provide an annular groove 14 on the inner peripheral surface of the drum portion 5 of the fender body 1 at the longitudinal center of the drum portion 5 and/or annular grooves 15, 16 at the boundaries between the enlarged portions 7, 8 and the straight portion of the drum 5, as shown in FIG 6. With such annular grooves, the buckling characteristics of the fender bodies 1 will be further improved.

Referring to FIG. 6, the dimension of the fender body 1 of the invention should preferably satisfy the following relations $$D = (1.4 \text{ to } 2.1) \times d$$
$$H = (0.8 \text{ to } 1.5) \times D$$

here, $D$: outside diameter of the fender body,
$d$: inside diameter of the fender body, and
$H$: height of the fender body.

With the fender body of the dimension in the aforesaid range, the compressive load causes swelling of the fender body until the height $H$ is reduced to $\frac{1}{2}H$. Such large deflection of the fender body facilitates considerably large energy absorption thereby.

If the dimension of the fender body is limited to the following range, the axial-rigidity/shearing-rigidity ratio of the fender body can be improved to 4 to 6.

$$D = (1.4 \text{ to } 1.6) \times d$$
$$H = (1.0 \text{ to } 1.2) \times D$$

By using such a large axial-rigidity/shearing-rigidity ratio, oblique load to the fender assembly can effectively be borne by the fender bodies 1, such as those caused by berthing and mooring of a vessel in oblique direction, forward and backward movement of the vessel during the berthing and mooring, and the pitching, rolling, and yawing of a berthed vessel. Furthermore, the aforesaid dimension of the fender bodies is effective in preventing the fender assembly from losing the damping power when being subjected to heavy oblique load.

In the fender body 1 of the invention, the drum portion 5 and the flanges 2 and 3 are integrally molded. Accordingly there is no need for various auxiliary facilities. Excellent energy absorption, or damping effect, can be obtained simply by mounting the fender bodies 1 between the quay wall W and the frontal plate 11. The marine fender assembly of the present invention is very simple in construction and yet highly durable without necessitating any complicated maintenance or inspection. Thus, the marine fender assembly of the invention is very economical.

The frontal plate 11 can be made of a metallic plate reinforced by shaped steels, or by molding suitable synthetic resin. If the frontal plate 11 is made of elastomer, e.g., natural or synthetic rubber or resin, as shown in FIG. 3, its edge should preferably be rounded or chamfered, in order to prevent it from being cracked by the berthing shock. It is essential that the frontal plates 11 have sufficient mechanical strength to withstand various movement of the vessel being berthed and moored.

It should be noted here that the fender bodies 1 of the aforesaid construction have such shearing rigidity, or strength, that the frontal plate 11 can be supported solely by the fender bodies 1 without using any auxiliary facilities.

In order to avoid metal-to-metal contact between the frontal plate 11 and the vessel being berthed or moored, contact pads 12 are preferably mounted on the shock-receiving member 11. The size and the number of the contact pads 12 are determined depending on the mechanical strength of the sideboard of the vessel, or the permissible magnitude of compressive stress. The number $n$ of the contact pads 12 to be used in a marine fender assembly can be given by $$n \geq (R x N)/(S_p x \sigma_p)$$

here, $R$: reactive force of the fender body,
$N$: number of fender bodies,
$S_p$: area of the pad, and
$\sigma_p$: permissible compressive stress.

What is meant by the last mentioned formula is that the total area of the frontal plate, as measured in parallel to the wall being protected, satisfies the condition of $S \geq R_0/\sigma$, $S$ being total area of those portions of all the frontal plates in the fender assembly which are engageable with a berthing vessel, taken in parallel with the wall being protected, $R_o$ being maximum total reactive force of all the fender bodies in the fender assembly, and $\sigma$ being mechanical strength of the sideboard of the vessel being directly berthed to the fender assembly.

Preferable properties of elastomer, e.g., natural and synthetic rubber, for making the fender body 1 are as follows.

| | |
|---|---|
| Shore hardness | 40 to 80 degrees |
| Elongation 350% min. | |
| Compression set after heating at 70° C. for 24 hours | 25% max. |

In the foregoing disclosure, the fender body 1 is described as a hollow cylindrical member, but it is possible to use a fender body 1 of hollow polygonal prism shape. In the case of polygonal lateral cross section, the aforesaid dimensions $D$ and $d$ of the fender body 1 can be taken as the distances between opposing inner and outer peripheral surfaces of the fender body, respectively. If the polygon has a large number of sides, $D$ and $d$ can be represented by diameters of the circumscribed circle and the inscribed circle of the polygonal lateral cross section, respectively.

The marine fender assembly of the present invention is particularly effective for berthing large vessels, e.g., vessels of 10,000 to 1 million tons. A frontal plate 11 is usually combined with one to six fender bodies 1, and suitable sets of the fender assemblies are mounted on the quay walls. The height $H$ of the fender body can be standardized in several classes, e.g., 630, 800, 1,000, 1,250, 1,600, 2,000 mm, etc., which classes are selected according to the preferred numbers as defined in JIS-28,601 (Japanese Industrial Standard). The maximum energy absorption by one fender body 1 increases in a geometric progression as its height $H$ increases according to the aforesaid classes. Accordingly, the total energy absorbable by one marine fender assembly can easily be calculated.

Figure 5:
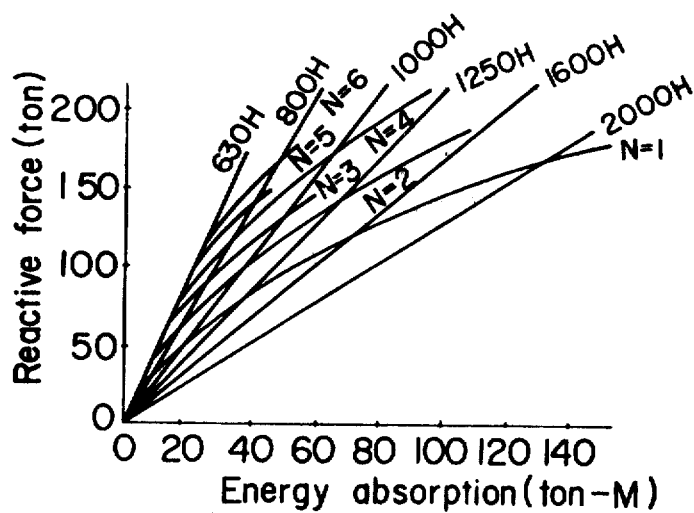
FIG. 5 is a graph showing the relation between reactive force and energy absorption.

FIG. 5 illustrates curves representing the relation between the load and the energy absorption which can be dealt with by the marine fender assembly consisting of different number of fender bodies of the present invention. For instance, if a designer wants a marine fender assembly which should absorb 30 ton-m of energy at a load smaller than 110 tons, he has the following choice.

i. Four 800-mm high fender bodies.
ii. Two 1,000-mm high fender bodies.
iii. One 1,250-mm high fender body.

Thus, the designer can have a wide range of choice to meet various specific needs at the quay.

Figure 4:
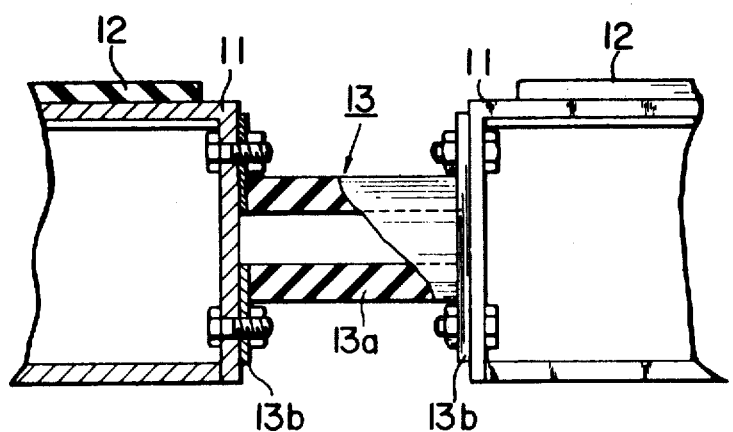
FIG. 4 is a side elevation of a resilient tie member connecting adjacent frontal plates.

Referring to FIG. 4, if a plurality of frontal plates 11 are used, in conjunction with a plurality of fender bodies 1, such frontal plates 11 should preferably be connected together by suitable joints 13 within a marine fender assembly. In the illustrated embodiment, the joint 13 consists of a pair of iron rings 13b integrally formed with a cylindrical body 13a made of elastomer, e.g., natural or synthetic rubber. Thereby, relative movement is allowed between adjacent fender bodies 1 in a fender assembly, so that the berthing impact from the vessel can be distributed among all the fender bodies 1 and frontal plates 11 in the assembly without causing any undesirable excessive load or shear in the marine fender assembly.

Instead of mounting on a quay, the marine fender assembly of the present invention can be mounted on any wall to be protected against large impact, such as stern, stem or sideboard of pusher boats and tag boats.

What I claim is:

1. A marine fender assembly, comprising at least one frontal plate being disposed on a plane parallel to but spaced from a wall which is to be protected from impact, and at least one fender body disposed between said frontal plate and said wall, said fender body being made of elastomer and comprising a hollow cylindrical portion and a pair of flanges integrally formed with said cylindrical portion at longitudinally opposing ends thereof, one of said flanges being directly mounted to said wall while the other one of said flanges holding said frontal plate, said fender body having an axis disposed at right angles to the wall to be protected, said fender body having a pair of annular enlarged portions along boundaries between said cylindrical portion and said two flanges, respectively; and the total surface area of said frontal plate satisfies the condition of $S \geq R_0/\sigma$, $S$ being the total area of those portions of all the frontal plates in the fender assembly which are engageable with a berthing vessel taken in parallel with the wall being protected, $R_o$ being the maximum total reactive force of all the fender bodies in the fender assembly, and $\sigma$ being the mechanical strength of the sideboard of the vessel being directly berthed to the fender assembly.

2. A marine fender assembly according to claim 1, wherein a plurality of frontal plates are disposed on a plane parallel to but spaced from the wall being protected from impact, each of said frontal plates being individually supported by flanges of a corresponding one of said fender bodies.

3. A marine fender assembly according to claim 1, wherein said frontal plate comprising a synthetic resin plate having corners thereof chamfered.

4. A marine fender assembly according to claim 1, wherein a plurality of frontal plates are disposed on a plane parallel to but spaced from a wall, each said frontal plate being supported by at least two of said fender bodies.

5. A marine fender assembly according to claim 1, wherein said fender body has an annular groove formed along the inner periphery thereof at the longitudinal center thereof.

6. A marine fender assembly according to claim 1, wherein said fender body has a pair of annular grooves along the boundaries between said cylindrical portion and said enlarged portions, respectively.

7. A marine fender assembly according to claim 2, wherein said frontal plates are connected with each other through joints made of resilient material.

8. A marine fender assembly according to claim 4, wherein said frontal plates are connected with each other through joints made of resilient material.

9. A marine fender assembly according to claim 1 and further comprising pads mounted on the outer surface of said frontal plate, said pads being made of resilient material.